(12) United States Patent
Harvey et al.

(10) Patent No.: US 11,934,506 B2
(45) Date of Patent: *Mar. 19, 2024

(54) METHODS, APPARATUS AND SYSTEMS FOR BIOMETRIC PROCESSES

(71) Applicant: Cirrus Logic International Semiconductor Ltd., Edinburgh (GB)

(72) Inventors: Thomas Ivan Harvey, Edinburgh (GB); John Paul Lesso, Edinburgh (GB)

(73) Assignee: Cirrus Logic Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/981,170

(22) Filed: Nov. 4, 2022

(65) Prior Publication Data

US 2023/0058320 A1 Feb. 23, 2023

Related U.S. Application Data

(63) Continuation of application No. 16/834,047, filed on Mar. 30, 2020, now Pat. No. 11,531,738.

(60) Provisional application No. 62/839,957, filed on Apr. 29, 2019, provisional application No. 62/839,937, filed on Apr. 29, 2019.

(51) Int. Cl.
*G06F 21/32* (2013.01)
*G06F 3/16* (2006.01)
*G06F 9/54* (2006.01)
*H04R 3/04* (2006.01)

(52) U.S. Cl.
CPC ............ *G06F 21/32* (2013.01); *G06F 3/167* (2013.01); *G06F 9/542* (2013.01); *H04R 3/04* (2013.01); *H04R 2460/01* (2013.01)

(58) Field of Classification Search
CPC .......... G06F 21/32; G06F 3/167; G06F 9/542; G06F 3/165; H04R 3/04; H04R 2460/01; H04R 29/00
USPC .................................. 381/56; 704/275, 231
See application file for complete search history.

(56) References Cited

U.S. PATENT DOCUMENTS

| 5,787,187 A | 7/1998 | Bouchard et al. |
| 9,325,821 B1 | 4/2016 | Hendrix et al. |
| 2008/0262382 A1* | 10/2008 | Akkermans ............. G07C 9/37 600/559 |

(Continued)

FOREIGN PATENT DOCUMENTS

| KR | 20160099232 A | 8/2016 |
| WO | 2006054205 A1 | 5/2006 |

(Continued)

OTHER PUBLICATIONS

Combined Search and Examination Report under Sections 17 and 18(3), UKIPO, Application No. GB1908804.6, dated Dec. 11, 2019.

(Continued)

*Primary Examiner* — Norman Yu
(74) *Attorney, Agent, or Firm* — Jackson Walker L.L.P.

(57) ABSTRACT

A method for use in a biometric process, comprising: for a first function and a second function, applying an acoustic stimulus to a user's ear; and for the second function: receiving a response signal of a user's ear to the acoustic stimulus; and extracting, from the response signal, one or more features for use in a biometric process, wherein the first function is a function other than to induce the response signal for use in the biometric process.

14 Claims, 8 Drawing Sheets

(56) References Cited

U.S. PATENT DOCUMENTS

| | | | |
|---|---|---|---|
| 2009/0061819 A1 | 3/2009 | Coughlan et al. | |
| 2014/0297284 A1 | 10/2014 | Gruber et al. | |
| 2017/0214997 A1 | 1/2017 | Kaller et al. | |
| 2018/0376234 A1* | 12/2018 | Petrank | H04R 1/1083 |
| 2019/0012445 A1 | 1/2019 | Lesso et al. | |
| 2019/0012446 A1 | 1/2019 | Lesso | |
| 2019/0095653 A1 | 3/2019 | Kurosawa | |
| 2020/0320770 A1* | 10/2020 | Charlson | G06Q 50/26 |

FOREIGN PATENT DOCUMENTS

| | | |
|---|---|---|
| WO | 2014061578 A1 | 4/2014 |
| WO | 2018213746 A1 | 11/2018 |
| WO | 2018034178 A1 | 6/2019 |
| WO | 2018198310 A1 | 2/2020 |

OTHER PUBLICATIONS

Combined Search and Examination Report under Sections 17 and 18(3), UKIPO, Application No. GB1908797.2, dated Nov. 14, 2019.
Combined Search and Examination Report under Sections 17 and 18(3), UKIPO, Application No. GB1908803.8, dated Dec. 11, 2019.
Combined Search and Examination Report under Sections 17 and 18(3), UKIPO, Application No. GB1908799.8, dated Nov. 20, 2019.

* cited by examiner

METHODS, APPARATUS AND SYSTEMS FOR BIOMETRIC PROCESSES

The present disclosure is a continuation of U.S. Nonprovisional patent application Ser. No. 16/834,047, filed Mar. 30, 2020, which claims priority to U.S. Provisional Patent Application Ser. No. 62/839,937, filed Apr. 29, 2019, and U.S. Provisional Patent Application Ser. No. 62/839,957, filed Apr. 29, 2019, each of which is incorporated by reference herein in its entirety.

TECHNICAL FIELD

Embodiments of the disclosure relate to methods, apparatus and systems for biometric processes, and particularly to methods, apparatus and systems for biometric processes involving the measured response of a user's ear to an acoustic stimulus.

BACKGROUND

It is known that the acoustic properties of a user's ear, whether the outer parts (known as the pinna or auricle), the ear canal or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize an individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstral coefficients. More generally, the transfer function between the acoustic stimulus and the measured response signal (or features of the transfer function) may be determined, and compared to a stored transfer function (or stored features of the transfer function) which is characteristic of the user.

A problem associated with ear biometric systems is that the signal to noise ratio of the measured response signal from the user's ear is typically quite low as the biometric features of the signal are relatively weak. This problem can be exacerbated depending on a number of factors. For example, the acoustic signal used to generate the measured response tends to have a narrow bandwidth and low amplitude so as not to be overbearing on the user. For example, the user may be present in a noisy environment. For example, earphones used to acquire the ear biometric data may be poorly fitted to the user's ear (e.g. inserted too far into the user's ear, or not sufficiently inserted).

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to a first aspect of the disclosure, there is provided a method for use in a biometric process, comprising: for a first function and a second function, applying an acoustic stimulus to a user's ear; and for the second function: receiving a response signal of a user's ear to the acoustic stimulus; and extracting, from the response signal, one or more features for use in a biometric process, wherein the first function is a function other than to induce the response signal for use in the biometric process.

The first function may comprise providing speech to the user from a virtual assistant.

The acoustic stimulus may comprise the speech. Such speech may comprise a question from the virtual assistant or a confirmation of a request received by the virtual assistant from the user.

The first function may comprise notifying the user that biometric enrolment or biometric authentication or on-ear detection is taking place. The acoustic stimulus may comprise a notification that biometric enrolment or biometric authentication or on-ear detection is taking place.

The first function may comprise playing media content to the user. The acoustic stimulus may comprise the media content.

The first function may be the calibration of active noise cancellation (ANC). In which case, the acoustic stimulus may comprise an ANC calibration sound.

The first function may be hearing augmentation. In which case, the acoustic stimulus may comprise sound received at an external microphone.

The first function may be sidetone injection. The acoustic stimulus may comprise a component of the user's voice.

The step of receiving the response signal of the user's ear to the acoustic stimulus may be performed for both the first function and the second function.

The method may further comprise modifying the acoustic stimulus before application to the user's ear.

Modifying the acoustic stimulus comprises one or more of: (i) modifying the gain of the acoustic stimulus; (ii) increasing the duration of the acoustic stimulus; (iii) applying an additional instance of the acoustic stimulus; (iv) shifting the pitch of the acoustic stimulus such that content of the response signal is better aligned with one or more resonances of the user's ear; (v) adding a masking noise to the acoustic stimulus; (vi) amplifying ambient noise and/or user voice via hear through mode or sidetone path; (vii) using a masking model to add additional content to the acoustic stimulus that is inaudible to the user; (viii) adding harmonic content to the acoustic stimulus.

The biometric process may be one of biometric enrolment, biometric authentication, and on-ear detection. Biometric enrolment may comprise generating and storing a unique model for the user based on the one or more features. Biometric authentication may comprise comparing the one or more features to a unique model for the user.

The audio stimulus may be applied to the user's ear using a transducer of a personal audio device.

The method may further comprise detecting the response signal at a microphone of a personal audio device.

According to another aspect of the disclosure, there is provided an apparatus, comprising processing circuitry and a non-transitory machine-readable which, when executed by the processing circuitry, cause the apparatus to: for a first function and a second function, apply an acoustic stimulus to a user's ear; and for the second function: receive a response signal of a user's ear to the acoustic stimulus; and extract, from the response signal, one or more features for use in a biometric process, wherein the first function is a function other than to induce the response signal for use in the biometric process.

The apparatus may comprise: a transducer configured to apply the acoustic stimulus; and a microphone configured to detect the response signal of the user's ear. Alternatively, the apparatus may comprise: a transducer configured to both apply the acoustic stimulus and detect the response signal of the user's ear.

The first function may comprise confirming to the user that a personal audio device has been inserted into an ear of the user.

The first function may comprise providing speech to the user from a virtual assistant.

The acoustic stimulus may comprise the speech. Such speech may comprise a question from the virtual assistant or a confirmation of a request received by the virtual assistant from the user.

The first function may comprise notifying the user that biometric enrolment or biometric authentication is taking place. The acoustic stimulus may comprise a notification that biometric enrolment or biometric authentication is taking place.

The first function may comprise playing media content to the user. The acoustic stimulus may comprise the media content.

The first function may be the calibration of active noise cancellation (ANC). In which case, the acoustic stimulus may comprise an ANC calibration sound. The processing circuitry may be further configured to cause the apparatus to calibrate ANC.

The first function may be hearing augmentation. In which case, the acoustic stimulus may comprise sound received at an external microphone.

The first function may be sidetone injection. In which case, the acoustic stimulus may comprise a component of the user's voice.

The step of receiving the response signal of the user's ear to the acoustic stimulus may be performed by the apparatus for both the first function and the second function.

The biometric process may be one of biometric enrolment and biometric authentication. Biometric enrolment may comprise generating and storing a unique model for the user based on the one or more features. Biometric authentication may comprise comparing the one or more features to a unique model for the user.

The processing circuitry may be configured to cause the apparatus to detect the response signal at a microphone of a personal audio device.

According to another aspect of the disclosure, there is provided an electronic device, comprising an apparatus as described above.

According to another aspect of the disclosure, there is provided a non-transitory machine-readable medium storing instructions which, when executed by one or more processors, cause an electronic apparatus to: for a first function and a second function, applying an acoustic stimulus to a user's ear; for the second function, receiving a response signal of a user's ear to the acoustic stimulus; and extracting, from the response signal, one or more features for use in a biometric process, wherein the first function is a function other than to induce the response signal for use in the biometric process.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting example only with reference to the accompanying drawings, in which.

DESCRIPTION OF EMBODIMENTS

As noted above, ear biometric data may be acquired by the generation of an acoustic stimulus, and the detection of an acoustic response of the ear to the acoustic stimulus. One or more features may be extracted from the response signal, and used to characterize the individual.

The acoustic stimulus may be generated and the response measured using a personal audio device. As used herein, the term "personal audio device" is any electronic device which is suitable for, or configurable to, provide audio playback substantially to only a single user. Some examples of suitable personal audio devices are shown in FIGS. 1a to 1e.

Figure 1A:
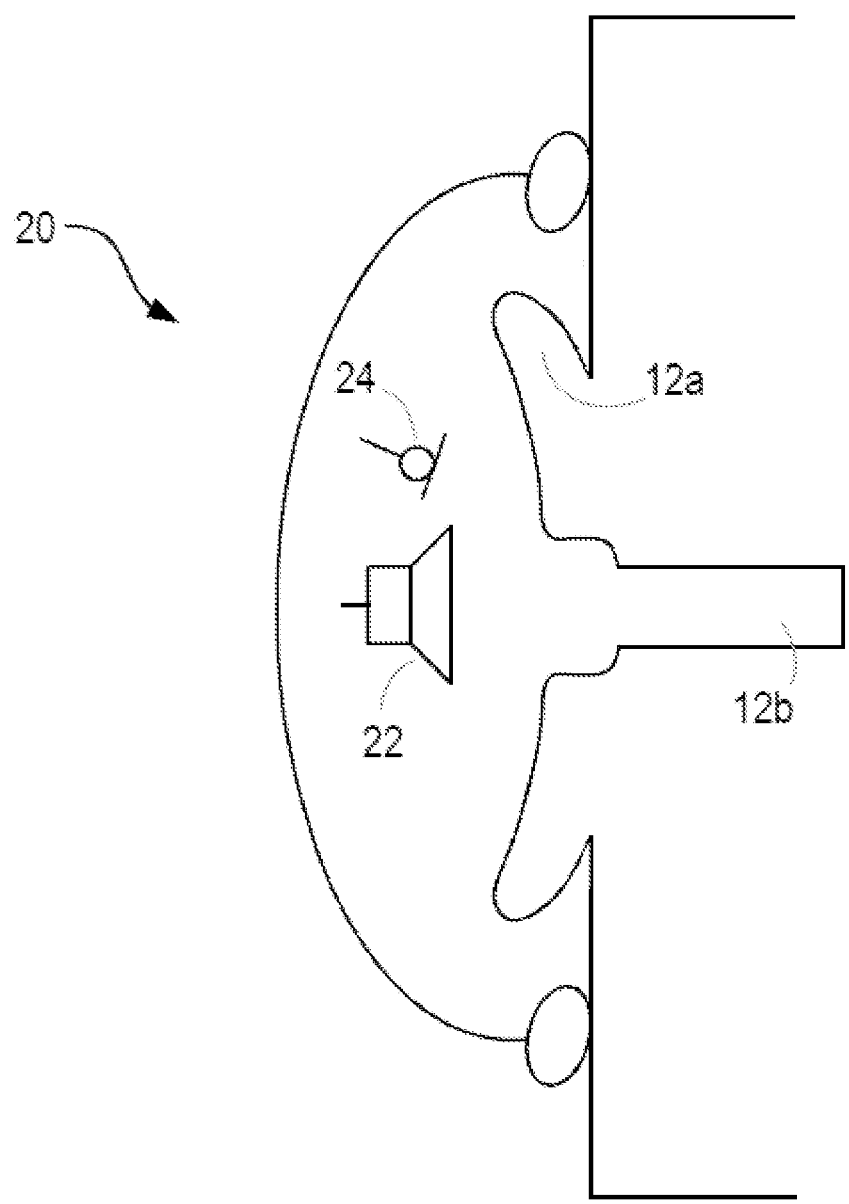
FIGS. 1a to 1e are schematic diagrams of example personal audio devices.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle 12a, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b.

The headphone may be able to perform active noise cancellation, to reduce the amount of noise experienced by the user of the headphone. Active noise cancellation operates by detecting a noise (i.e. with a microphone), and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

Figure 1B:
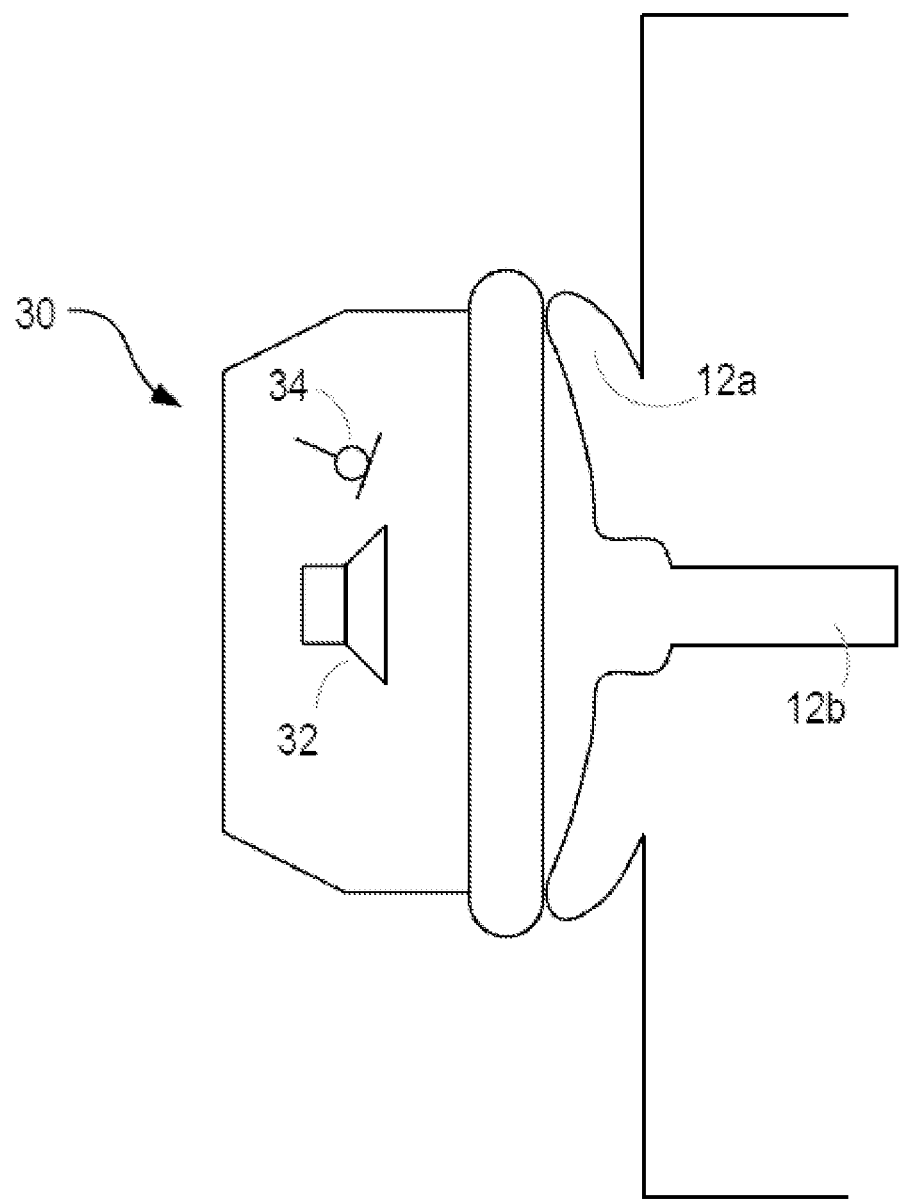

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circum-aural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
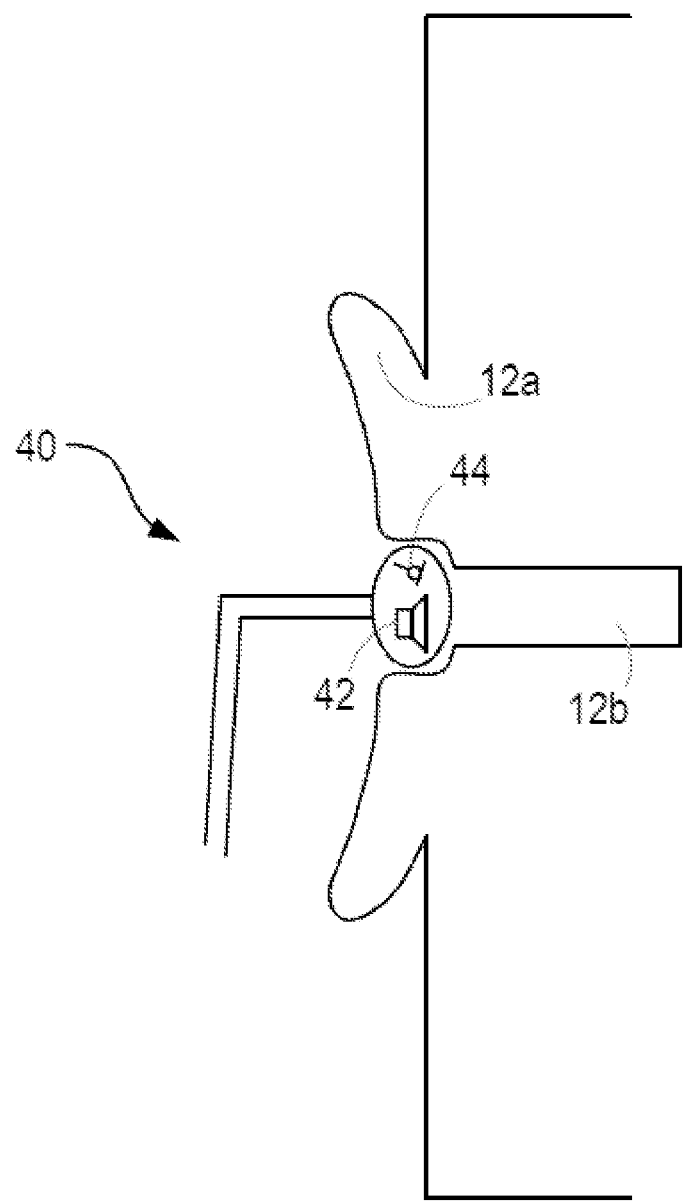

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
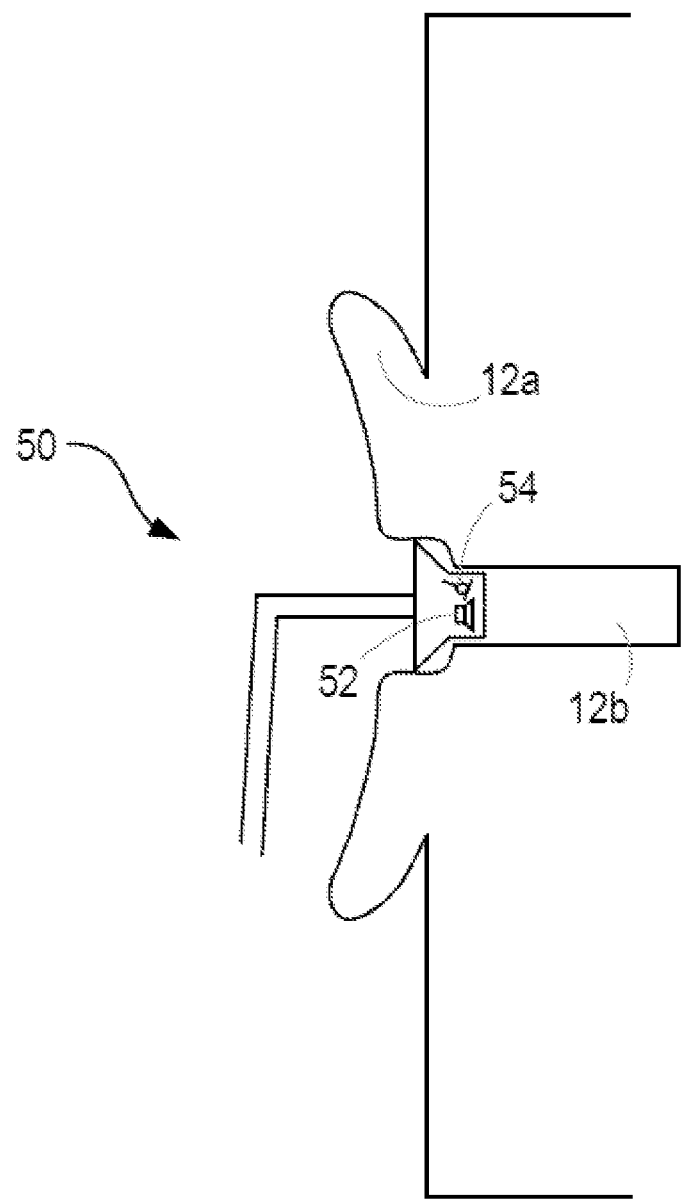

FIG. 1d shows a further alternative personal audio device 50, comprising an in-ear headphone (or earphone), insert headphone, or ear bud. This headphone is configured to be partially or totally inserted within the ear canal 12b, and may provide a relatively tight seal between the ear canal 12b and the external environment (i.e. it may be acoustically closed or sealed). The headphone may comprise one or more loudspeakers 52 and one or more microphones 54, as with the others devices described above, and these components may form part of an active noise cancellation system.

As the in-ear headphone may provide a relatively tight acoustic seal around the ear canal 12b, external noise (i.e. coming from the environment outside) detected by the microphone 54 is likely to be low.

Figure 1E:
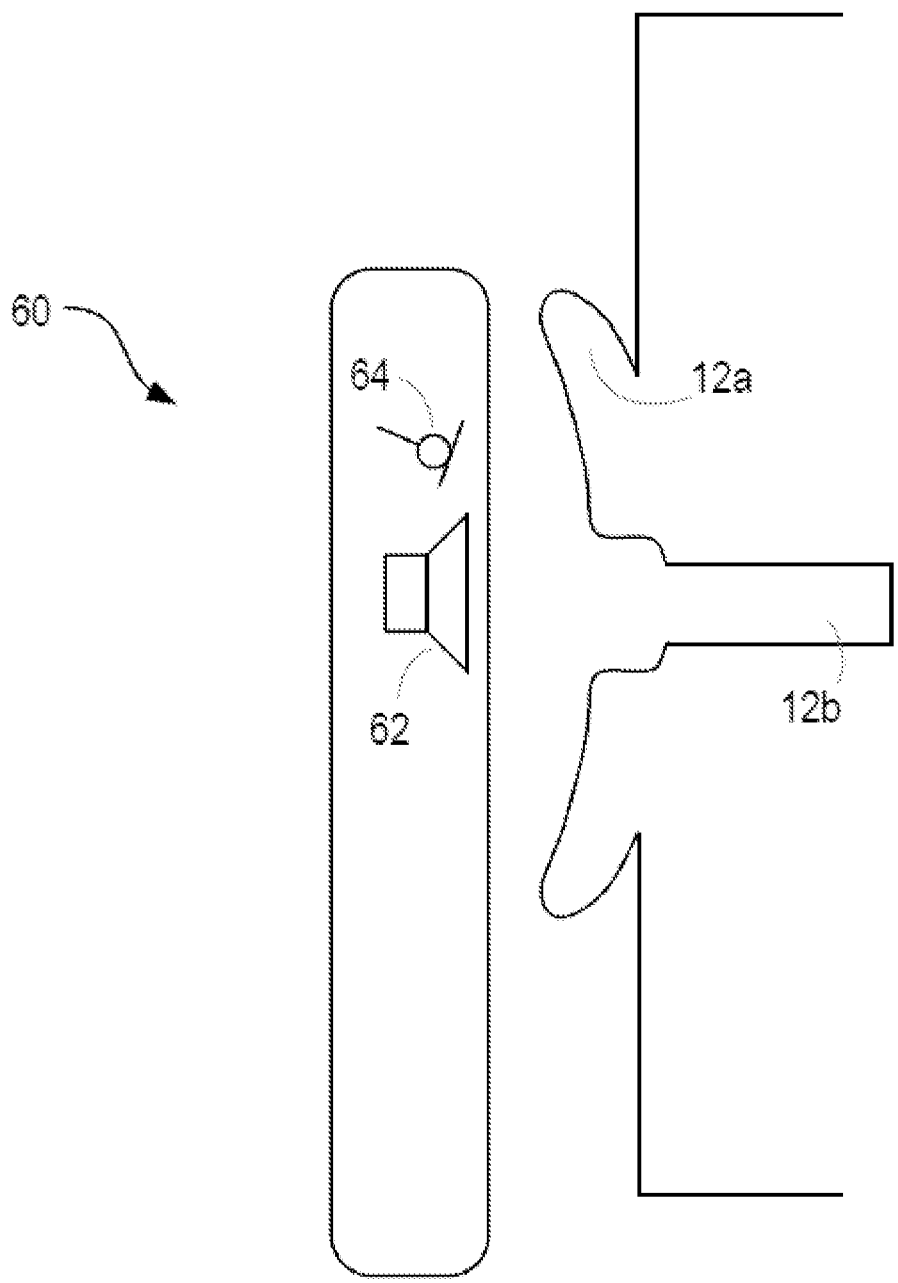

FIG. 1e shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the frequency response of the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. The acoustic stimulus may have frequency components which span one or more of sonic, ultra-sonic, and near-ultrasonic ranges. In some examples the microphone signal may be processed to measure received signals of the same frequency as that transmitted.

Each of the personal audio devices described above comprises one or more loudspeakers in addition to one or more microphones. However, in some embodiments, the one or more speakers may be used both to generate an acoustic stimulus and as an input device to detect and measure a response of the user's ear to the acoustic stimulus, e.g. to measure acoustic waves reflected from the ear canal or the pinna. For example, the response of the user's ear may be estimated by measuring the current through the loudspeaker or transducer. Alternatively, for example, the response of the user's ear may be estimated by calculating the impedance of the loudspeaker or transducer. In such cases, the one or more microphones may be omitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency $2*f1-f2$. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data relating to the auricle 12a, the ear canal 12b, or a combination of both the auricle 12a and the ear canal 12b. For example, the circum-aural headphones shown in FIG. 1a will generally acquire data relating to the auricle 12a and potentially also the ear canal 12b. The insert headphones shown in FIG. 1d will generally acquire data relating only to the ear canal 12b.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal 12b through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12b.

All of the devices shown in FIGS. 1a to 1e and described above may be used to implement aspects of the disclosure.

Figure 2:
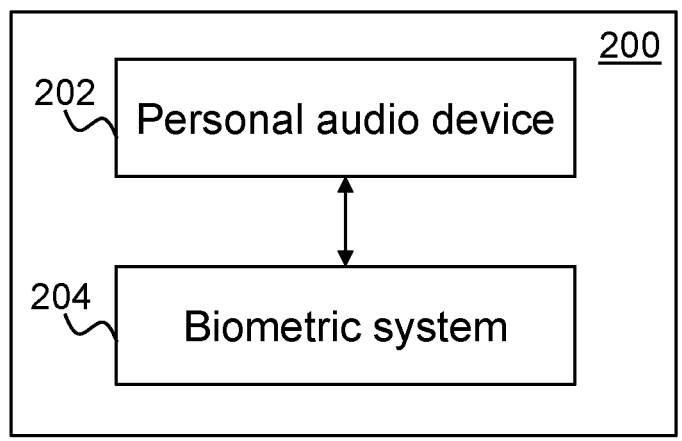
FIG. 2 is a block diagram of an arrangement according to embodiments of the present disclosure.

FIG. 2 shows an arrangement 200 according to embodiments of the disclosure. The arrangement 200 comprises a personal audio device 202 and a biometric system 204. The personal audio device 202 may be any device which is suitable for, or configurable to provide audio playback to substantially a single user. The personal audio device 202 generally comprises one or more loudspeakers, and one or more microphones which, in use, are positioned adjacent to or within a user's ear. The personal audio device 202 may be wearable, and comprise headphones for each of the user's ears. Alternatively, the personal audio device 202 may be operable to be carried by the user, and held adjacent to the user's ear or ears during use. The personal audio device 202 may comprise headphones or a mobile phone handset, as described above with respect to any of FIGS. 1a to 1e.

The biometric system 204 is coupled to the personal audio device 202 and operative to control the personal audio device 202 to acquire biometric data which is indicative of the individual using the personal audio device 202.

The personal audio device 202 thus generates an acoustic stimulus for application to the user's ear, and detects or measures the response of the ear to the acoustic stimulus. The measured response corresponds to the reflected signal received at the one or more microphones, with certain frequencies being reflected at higher amplitudes than other frequencies owing to the particular response of the user's ear.

Some examples of suitable biometric processes include biometric enrolment and biometric authentication. Enrolment comprises the acquisition and storage of biometric data which is characteristic of an individual. In the present context, such stored data may be known as an "ear print". Authentication (sometimes referred to as verification or identification) comprises the acquisition of biometric data from an individual, and the comparison of that data to the stored ear prints of one or more enrolled or authorised users. A positive comparison (i.e. a determination that the acquired data matches or is sufficiently close to a stored ear print) results in the individual being authenticated. For example, the individual may be permitted to carry out a restricted action, or granted access to a restricted area or device. A negative comparison (i.e. a determination that the acquired data does not match or is not sufficiently close to a stored ear print) results in the individual not being authenticated. For example, the individual may not be permitted to carry out the restricted action, or granted access to the restricted area or device.

The biometric system 204 may, in some embodiments, form part of the personal audio device 202 itself. Alternatively, the biometric system 204 may form part of an electronic host device (e.g. an audio player) to which the personal audio device 202 is coupled, through wires or wirelessly. In yet further embodiments, operations of the biometric system 204 may be distributed between circuitry in the personal audio device 202 and the electronic host device.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

As mentioned previously, a problem associated with ear biometric systems is that the signal to noise ratio of the measured response signal is typically quite low as the biometric features of the signal are relatively weak. This problem can be exacerbated by the use of an acoustic signal having properties which minimize audibility to the user but also minimize response from the user's ear. Typically, the acoustic stimulus is preset, for example, to have a flat frequency spectrum over a relatively narrow frequency range and to have a low volume so as not to surprise or irritate the user of the personal audio device 202.

Embodiments of the present disclosure aim to improve the signal to noise ratio (SNR) of the measured response signal by reusing audio already being output to a transducer of the personal audio device for use in the biometric enrolment or authentication. Specifically, embodiments of the present invention use audio output to a speaker or transducer of a personal audio device for two functions, a first function and a second function. The first function may vary between embodiments. The second function may be as an acoustic stimulus to induce a response from an ear of a user for use in a biometric process. The biometric process may determine whether a response measured at the personal audio device 202 is a response induced from an ear, to thereby detect whether or not a headset, headphone or earphone or the like is located in or on the ear of a user. Alternatively, the biometric process may involve biometric enrolment or authentication based on the measured response.

Examples of the first function include, but are not limited to notifying the user that biometric (or other) authentication is imminent, ongoing, or completed, providing information from a virtual assistant (e.g. questions, statements etc.), delivering audio media to the user's ear (e.g. music, radio, podcasts, etc.), providing a calibration sound to the user's ear for the purpose of calibrating active noise cancellation (ANC), to inject sound into the ear for hearing augmentation (e.g. hear through), injecting sidetone into the user's ear. Many audio signals associated with such functions inherently comprise components having a signal bandwidth and level that is suitable for biometric process, since such audio needs to be heard clearly by a user and comprises a larger bandwidth of sound. Thus, by using audio signals already being output to a transducer of the personal audio device for a different reason, the amount of time where the ear canal response can be measured can be increased, which in turn leads to improved SNR in the measured response signal. Additionally, by using existing audio signals, more opportunities arise to measure the ear canal response of the user, thereby improving accuracy of enrolment and authentication. Such accuracy may be improved by fusing or otherwise combining separate ear canal response measurements. Accuracy may also be improved by making response measurements in response to an existing audio signal over a longer period of time where the existing audio signal has a longer duration than conventional acoustic stimuli used in ear biometrics.

Figure 3:
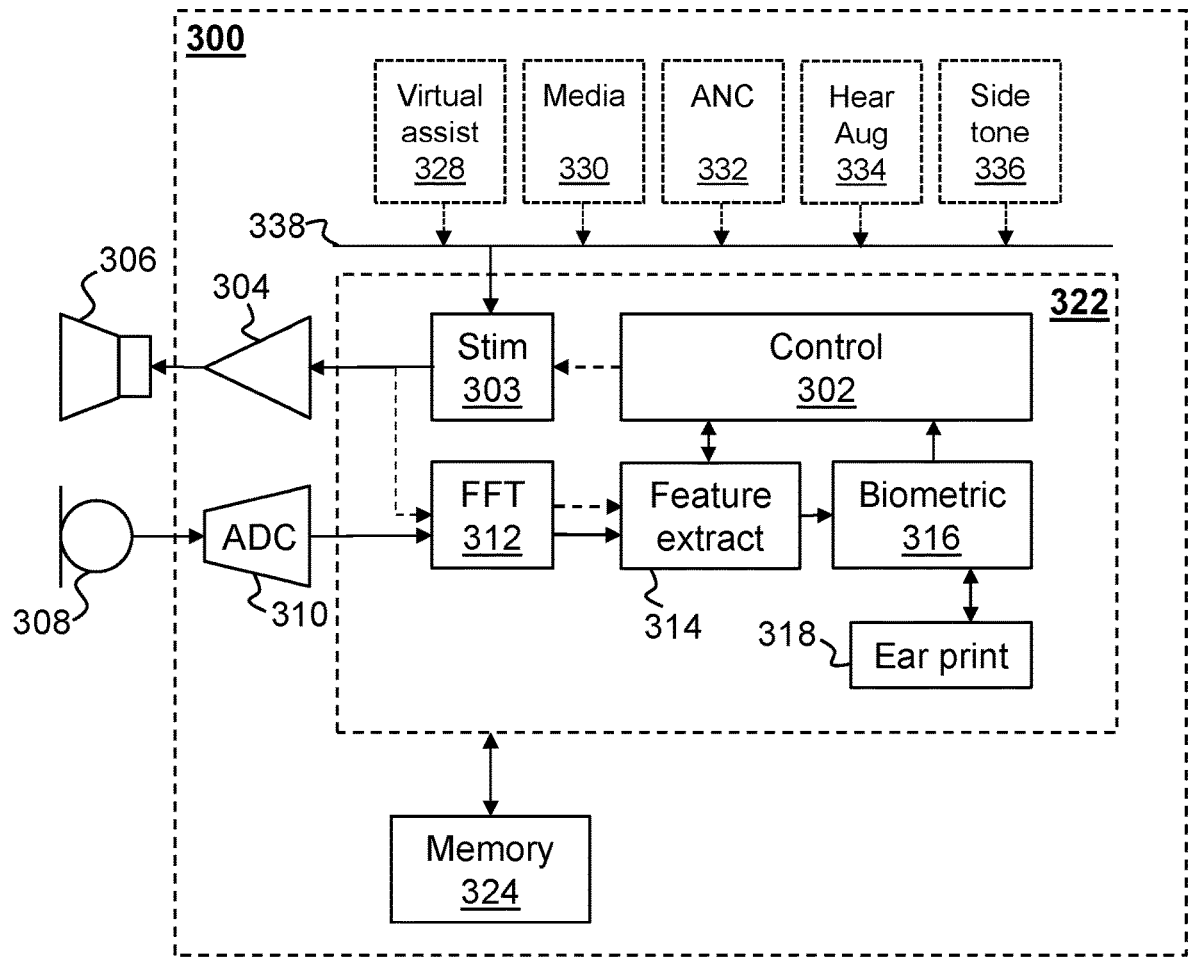
FIG. 3 is a block diagram of a system according to embodiments of the present disclosure.

FIG. 3 shows a system 300 according to embodiments of the disclosure.

The system 300 comprises processing circuitry 322, which may comprise one or more processors, such as a central processing unit or an applications processor (AP), or a digital signal processor (DSP).

The one or more processors may perform methods as described herein on the basis of data and program instructions stored in memory 324. Memory 324 may be provided as a single component or as multiple components or co-integrated with at least some of processing circuitry 322. Specifically, the methods described herein may be performed in processing circuitry 322 by executing instructions that are stored in non-transient form in the memory 324, with the program instructions being stored either during manufacture of the system 300 or personal audio device 202 or by upload while the system 300 or device 202 is in use.

The processing circuitry 322 comprises a stimulus generator module 303 which is coupled directly or indirectly to an amplifier 304, which in turn is coupled to a transducer 306. The transducer and a microphone 308 may form part of a personal audio device, such as the personal audio devices 20, 30, 40, 50, 60 described above with reference to FIGS. 1a to 1e.

The stimulus generator module 303 generates an electrical audio signal and provides the electrical audio signal to the amplifier 304, which amplifies it and provides the amplified signal to the transducer 306. The transducer 306 generates a corresponding acoustic signal which is output to the user's ear (or ears). In alternative embodiments, the amplifier 304 may form part of the stimulus generator module 303.

As noted above, the audio signal may be output to all or a part of the user's ear (i.e. the auricle 12a or the ear canal 12b of the user as described with reference to FIGS. 1a to 1e). With the personal device 202 fitted to the user's ear, the audio signal is reflected off the ear, and the reflected signal (or echo signal) is detected and received by the microphone 308. The reflected signal thus comprises data which is characteristic not only of an ear in general, but more specifically of the individual's ear. The reflected signal is thus suitable for use as a biometric, either to determine that the personal audio device 202 is in or on the user's ear or to determine a specific characteristic of the user's ear for use in biometric enrolment or authentication.

The reflected signal is passed from the microphone 308 to an analogue-to-digital converter (ADC) 310, where it is converted from the analogue domain to the digital domain. In alternative embodiments the microphone 308 may be a digital microphone and produce a digital data signal (which does not therefore require conversion to the digital domain).

The signal is detected by the microphone 308 in the time domain. However, the features extracted for the purposes of the biometric process may be in the frequency domain (in that it is the frequency response of the ear which is characteristic). In which case, the system 300 may comprise a Fourier transform module 312, which converts the reflected signal to the frequency domain. For example, the Fourier transform module 312 may implement a fast Fourier transform (FFT).

The transformed signal is then passed to a feature extract module 314, which extracts one or more features of the transformed signal for use in a biometric process (e.g. biometric enrolment, biometric authentication, on-ear detect (OED), in-ear detect etc.). For example, the feature extract module 314 may extract the resonant frequency of the user's ear. For example, the feature extract module 314 may extract one or more mel frequency cepstral coefficients. Alternatively, the feature extract module 314 may determine the frequency response of the user's ear at one or more predetermined frequencies, or across one or more ranges of frequencies. To extract such features, the acoustic stimulus generated at the stimulus generator module 303 is also provided to the feature extract module 314, optionally via the Fourier transform module 312, depending on whether the stimulus generator module 303 outputs the acoustic stimulus in the time or frequency domain. By providing the acoustic stimulus to the feature extract module 3014, a comparison can be made between the acoustic stimulus and the response to that acoustic stimulus from the user's ear.

The extracted feature(s) are passed to a biometric module 316, which performs a biometric process on them. For example, the biometric module 316 may determine whether the extracted features(s) indicate that the signal received at the microphone 308 contains a reflection from an ear in general, as opposed to open space for example. One or more extracted feature(s) may be compared to corresponding features in a stored ear print 318. The stored ear print 318 may in this instance be a generic ear print representative of the general population. In another example, the biometric module 316 may perform a biometric enrolment, in which the extracted features (or parameters derived therefrom) are stored as part of biometric data 318 which is characteristic of the individual (i.e. as an ear print). The biometric data 318 may be stored within the system 300 or remote from the system 300 (and accessible securely by the biometric module 316). In another example, the biometric module 316 may perform a biometric authentication, and compare the one or more extract features to corresponding features in the stored ear print 318 (or multiple stored ear prints). In this example, the stored ear print 318 may comprise ear prints obtained specifically from authorised users, for example during biometric enrolment. Again, the stored ear print 318 may be stored within the system 300 or remote from the system 300 (and accessible securely by the biometric module 316).

The biometric module 316 generates a biometric result (which may be the successful or unsuccessful generation of an ear print, and/or the successful or unsuccessful authentication and/or the successful or unsuccessful detection of an ear for the purposes of on-ear or in-ear detect). The biometric module 316 may then output the result to the control module 302.

As stated above, the stimulus generator module 303 generates an electrical audio signal and provides the electrical audio signal to the amplifier 304, which amplifies it and provides the amplified signal to the transducer 306. The stimulus generator module 303 may generate the electrical audio signal based on data received from one or more modules external to the processing circuitry 322 configured to implement system functionality not related to biometrics. For example, the stimulus generator module 303 may receive data from one or more of a virtual assistant module 328, a media module 330, an active noise cancellation (ANC) module 332, a hearing augmentation module 334 and a sidetone module 336. The stimulus generator module 303 may receive such data via a bus 338. The stimulus generator module 303 may then generate the electrical audio signal based on the data received. The data may itself comprise an electrical audio signal which the stimulus generator module 303 may then pass directly to the amplifier 304. In alternative embodiments, the stimulus generator module 303 may be omitted altogether and electrical audio signals may be provided from one or more of the external modules directly to the amplifier 304 or the transducer 306 itself.

The virtual assistant module 328 may be configured to generate audio cues or speech in response to a user interaction with the personal audio device 202. The virtual assistant module 328 may implement any known virtual assistant technology such as Siri® or Alexa®. The virtual assistant module 328 may cause the stimulus generator module 303 to generate the audio cue or speech based on a user interaction. For example, the user may initiate a virtual assistant with a tap or double tap of the personal audio device 202 or with a voice trigger, such as "Hey Siri" or "Alexa". In response to a question asked by the user to the virtual assistant, the virtual assistant module 328 may generate a response to be played via the transducer 306. For example, the virtual assistant may require further input to complete the user's query. Alternatively, the virtual assistant module 328 may generate an audio cue or speech signal or may cause the stimulus generator module 303 to generate the same in response to a non-user initiated event. For example, the virtual assistant module 328 may cause the stimulus generator module 303 to generate an audio signal containing speech, such as a question, e.g. "Your water bill is available to payment would you like me to pay?" In any case, embodiments of the present disclosure utilise the virtual assistant audio cues and/or speech signals which may be provided to the transducer 306 for the purpose of virtual assistance, for a second function, namely for use in biometric enrolment or authentication.

The media module 330 may be configured to output media to the stimulus generator module 303 causing the stimulus module 303 to generate an electrical audio signal comprising media content, such as music, speech (e.g. audiobooks, podcasts and the like) or other media content etc. Embodiments of the present disclosure may utilise the media content provided to the transducer 306 for the purpose of playing media to the user, for a second function, namely for use in biometric enrolment or authentication.

The ANC module 332 may be configured to implement feedback ANC, feed forward ANC or a combination of both feedback ANC and feed forward ANC in a manner known in the art. Feed forward and feedback ANC is described above in some detail and so will not be described again here. However, it will be appreciated that many ANC systems estimate an ear transfer function, for example by measuring the transfer function between a speaker or transducer and a microphone situated at the ear, and use this estimated transfer function for ANC. In some embodiments, the ANC module 332 may generate a calibration sound (typically to broadband noise) to use for estimating the ear transfer function of the user. The ANC module 332 may cause the stimulus generator module 303 to generate an electrical audio signal comprising the generated calibration sound for playback at the transducer 306. Embodiments of the present disclosure may utilise the ANC calibration sound provided to the transducer 306 for the purpose of calibrating ANC, for a second function, namely for use in biometric enrolment or authentication.

The hearing augmentation module 334 may be configured to implement hearing augmentation using the transducer 306, the microphone 308, and an additional microphone (not shown) external to the personal audio device 202. Hearing augmentation, also known as listen through, hear through, and hearing aid mode, involves the capture of external environmental sounds using a microphone external to a personal audio device and the injection of the captured external sounds into a speaker or transducer of the personal audio device so that a user can hear normally without removing the personal audio device from within or on their ears. The hearing augmentation module 334 may thus generate an augmentation signal based on audio signals received from an external microphone (not shown) in a manner known in the art and may cause the stimulus generator module 303 to generate an electrical audio signal to be output to the transducer 306. Embodiments of the present disclosure may utilise the generated hearing augmentation signal which is provided to the transducer 306 for the purpose of restoring external environmental sound at the user's ear, for a second function, namely for use in biometric enrolment or authentication.

The sidetone module 336 may be configured to cause the transducer 306 to apply sidetone to the user's ear. The sidetone module 336 may be configured to capture voice of the user using one or more microphones (not shown) external to the personal audio device 202 and generate a sidetone audio signal comprising the captured voice. The sidetone module 336 may provide the sidetone audio signal to the stimulus generator module 303 to be output to the transducer 306 for application to the user's ear. The function of the sidetone module 336 is to restore the user's own voice in their ear so that the sound of their voice when wearing the personal audio device 202 is the same or similar to as it would be if they were not wearing the personal audio device 202. Embodiments of the present disclosure may utilise the generated sidetone audio signal which is provided to the transducer 306 for the purpose of restoring a user's own voice in his ear(s), for a second function, namely for use in biometric enrolment or authentication.

In addition to the one or more external modules 328:336, in some embodiments, the control module 302 may control the stimulus generator module 303 to output an acoustic stimulus specifically for use in a biometric process. For example, the control module 302 may be configured to control the stimulus generator module 303 to output an authentication cue notifying the user that authentication is taking place. In another example, the control module 302 may be configured to control the stimulus generator module 303, for example, where it is found that acoustic stimulus generated based on data from one of the external modules 328:336 and used in a previous biometric process did not result in an adequate response from the user's ear based on data from one of the external modules 328:336. For example, the control module 302 may modify or adjust the properties of the acoustic stimulus (generated by one of the external modules 328:336) so as to maximise the SNR of the measured response signal. This modification may be done prior to applying the stimulus or during application of the stimulus. The modification may be based on the received response to audio stimulus generated.

The control module 302 may, for example, control the stimulus generator module 303 to increase the amplitude or level of the stimulus output to the transducer 306 or otherwise adjust the frequency response of the signal. For example, the control module 302 may add additional content to the acoustic stimulus that is inaudible to the user, such as by using a masking model, thereby increasing the level of the acoustic stimulus. The control module 302 may add harmonic content to the acoustic stimulus, thereby increasing the overall level of the acoustic stimulus. The control module 302 may add content to the acoustic stimulus at inaudible frequencies, thereby increasing the level of the acoustic stimulus.

In some embodiments, the control module 302 may modify the duration of the acoustic stimulus. For example, the control module 302 may increase the duration of the acoustic stimulus.

In some embodiments, the control module 302 may shift the pitch of the acoustic stimulus such that content of the response signal is better aligned with the user's ear canal resonances. For example, a user's ear canal response may be analysed using a broadband stimulus and data indicative of the stored user's ear canal resonances during enrolment of the user in the biometric system 300.

In some embodiments, the control module 302 may cancel the effect of noise from outside the ear on the response signal of the user's ear to the acoustic stimulus, for example, when it is determined that the user is in a relatively high noise situation. For example, the control module 302 may apply masking noise to the user's ear. The masking noise may be shaped to match a spectral shape of the noise from outside of the ear, i.e. background noise.

In some embodiments, an initial estimate of the ear canal response or a determination that the personal audio device 202 is on or in the ear, based on the response signal received at the microphone 308, may first be ascertained. Then, the control module 302 may control the stimulus generator module 303 to generate an additional acoustic probe signal/stimulus to confirm or strengthen the initial estimate for the purposes of biometric authentication or enrolment. As mentioned above, any modifications may be made to the additional stimulus output from the speaker 306, the original applied stimulus, or both.

It is noted that the ANC module 332, the hearing augmentation (HA) module 334 and/or the sidetone module 336 may directly or indirectly measure the ear transfer function in order for those modules 332, 334, 336 to respectively perform ANC, hearing augmentation and sidetone injection. In such circumstances, the system 300 may continuously or periodically record response signals and estimated ear transfer functions as and when they are measured for ANC, HA or sidetone purposes. Such information may be stored in memory 324 and provided to the biometric module 316. Such information may be used to enhance biometric processes, increase the speed of on/in-ear detect and/or enrolment and/or authentication, or providing information on the fit of the personal audio device in or on the ear of the user.

In some embodiments, the control module 302 may apply a model that takes into account the effect of spectral and/or temporal auditory masking (due to the audio artefact associated with the user interaction) to extend the frequency content and/or duration of the acoustic stimulus. The control module 302 may use information concerning the user interaction (e.g. peak amplitude/frequency response/attack/release) to update the model to contain a modified set of parameters that take into account the ability of the user to hear audio during and/or shortly after the user interaction.

The control module 302 may continue to control the stimulus generator module 303 even while the acoustic stimulus is being applied to the transducer 306. For example, the control module 302 may monitor the extracted features or the response signal itself to determine ongoing properties of the response signal.

In some embodiments the feature extract module 314 may be designed with foreknowledge of the nature of the stimulus, for example knowing the spectrum of the applied stimulus signal, so that the response or transfer function may be appropriately normalised. In other more suitable embodiments the feature extract module 314 may comprise a second input to monitor the stimulus (e.g. playback music, virtual assistant, ANC, hearing augmentation, sidetone, adjusted acoustic stimulus) and hence provide the feature extract module 314 with information about the stimulus signal or its spectrum so that the feature extract module 314 may calculate the transfer function from the acoustic stimulus to measured received signal from the microphone 308 from which it may derive the desired feature parameters. In the latter case, the acoustic stimulus may also pass to the feature extract module 314 via the FFT module 312 (denoted by dotted line in FIG. 3).

Figure 4:
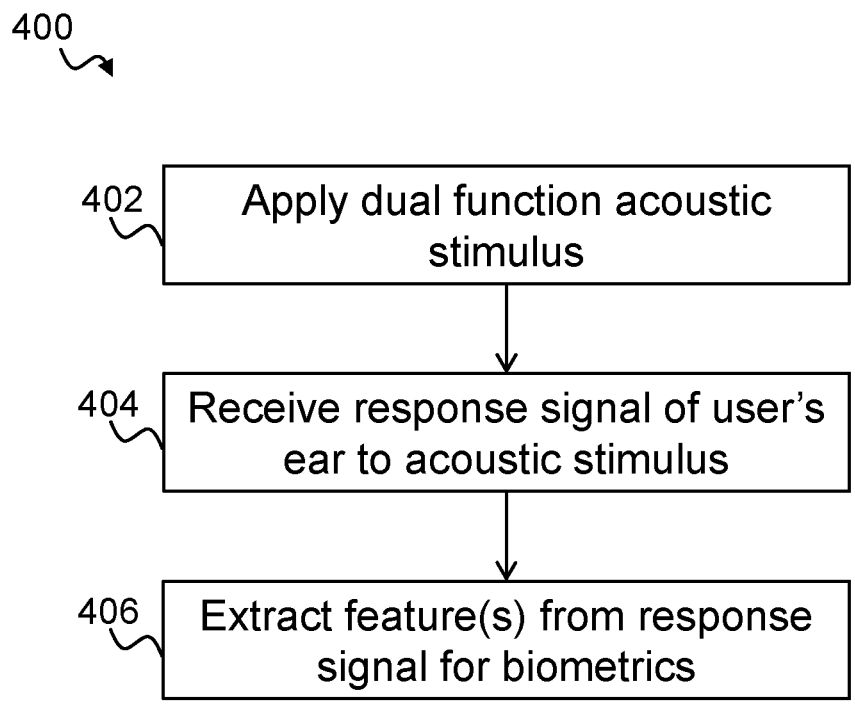
FIG. 4 is a flow diagram of a process according to embodiments of the present disclosure.

FIG. 4 is a flow diagram of a process 400 which may be performed by the system 300 shown in FIG. 3.

At step 402, the system 300 generates and applies an acoustic stimulus toward the user's ear using the transducer 306 (provided the transducer 306 is in proximity to the ear). The stimulus may be directed towards the outer part of the ear (i.e. the auricle), the ear canal, or both. The stimulus generator module 303 generates the acoustic stimulus for two functions. The first function is a function other than for a biometric process (on/in-ear detect, biometric enrolment or authentication etc.). The first function may be, for example, to notify a user that the personal audio device 202 is on the ear or connected, to notify the user that biometric (or other) authentication is imminent, ongoing, or completed, to provide information from a virtual assistant, to deliver audio media to the user's ear, to provide a calibration sound to the user's ear for the purpose of calibrating ANC, to inject sound into the ear for hearing augmentation (e.g. hear through), to inject sidetone into the user's ear. The second function is for the biometric process (on/in-ear detect, biometric enrolment or authentication).

At step 404, the system 300 receives sound incident at the microphone 308 which may comprise a response of the user's ear to the acoustic stimulus.

At step 406, the system 300 extracts, from a response signal, for example as received at the microphone 308, one or more features for use in a biometric process (e.g. authentication or enrolment). For example, the one or more features may comprise one or more of: the resonant frequency; the frequency response; and one or more mel frequency cepstral coefficients. Biometric enrolment may comprise generating and storing a unique model for the user based on the one or more features. Biometric authentication may comprise comparing the one or more features to a unique model for the user. In or on ear detecting may comprise comparing the one or more features to a model representative of an ear of the general population to confirm whether the microphone 308 and transducer 306 are in proximity to an ear at all.

Embodiments may be implemented in an electronic, portable and/or battery powered host device such as a smartphone, an audio player, a mobile or cellular phone, a handset. Embodiments may be implemented on one or more integrated circuits provided within such a host device. Embodiments may be implemented in a personal audio device configurable to provide audio playback to a single person, such as a smartphone, a mobile or cellular phone, headphones, earphones, etc. See FIGS. 1a to 1e. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments and implementations likewise, with the benefit of this disclosure, will be apparent to those having ordinary skill in the art, and such embodiments should be deemed as being encompassed herein. Further, those having ordinary skill in the art will recognize that various equivalent techniques may be applied in lieu of, or in conjunction with, the discussed embodiments, and all such equivalents should be deemed as being encompassed by the present disclosure.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method for use in a biometric process, comprising:
applying an acoustic stimulus to a user's ear for a first function and for a second function, wherein the first function is to notify the user that biometric authentication or biometric enrolment or on-ear detection is taking place and the second function is to perform the biometric process;
receiving a response signal of a user's ear to the acoustic stimulus;
extracting, from the response signal, one or more features for use in the biometric process;
determining that the response signal is unsuitable for use in the biometric process; and
responsive to determining that the response signal is unsuitable for use in the biometric process, modifying the acoustic stimulus to improve the signal-to-noise ratio of the received response signal.

2. The method of claim 1, wherein the first function comprises providing speech to the user from a virtual assistant and wherein the acoustic stimulus comprises the speech.

3. The method of claim 2, wherein speech comprises a question from the virtual assistant or a confirmation of a request received by the virtual assistant from the user.

4. The method of claim 1, further comprising modifying the acoustic stimulus before application to the user's ear.

5. The method of claim 4, wherein modifying the acoustic stimulus comprises one or more of:
(i) modifying the gain of the acoustic stimulus;
(ii) increasing the duration of the acoustic stimulus;
(iii) applying an additional instance of the acoustic stimulus;
(iv) shifting the pitch of the acoustic stimulus such that content of the response signal is better aligned with one or more resonances of the user's ear;
(v) adding a masking noise to the acoustic stimulus;
(vi) amplifying ambient noise and/or user voice via hear through mode or sidetone path;
(vii) using a masking model to add additional content to the acoustic stimulus that is inaudible to the user;
(viii) adding harmonic content to the acoustic stimulus.

6. The method of claim 1, wherein the biometric process is one of biometric enrolment, biometric authentication, and on-ear detection.

7. The method of claim 5, wherein biometric enrolment comprises generating and storing a unique model for the user based on the one or more features, and wherein biometric authentication comprises comparing the one or more features to a unique model for the user.

8. The method of claim 1, wherein the audio stimulus is applied to the user's ear using a transducer of a personal audio device.

9. The method of claim 1, further comprising detecting the response signal at a microphone of a personal audio device.

10. An apparatus, comprising processing circuitry and a non-transitory machine-readable which, when executed by the processing circuitry, cause the apparatus to:
apply an acoustic stimulus to a user's ear for a first function and for a second function, wherein the first function is to notify the user that biometric authentication or biometric enrolment or on-ear detection is taking place and the second function is to perform the biometric process;
receive a response signal of a user's ear to the acoustic stimulus;
extract, from the response signal, one or more features for use in a biometric process;
determine that the response signal is unsuitable for use in the biometric process; and
responsive to determining that the response signal is unsuitable for use in the biometric process, modify the acoustic stimulus to improve the signal-to-noise ratio of the received response signal.

11. The apparatus of claim 10, comprising:
a transducer configured to apply the acoustic stimulus; and
a microphone configured to detect the response signal of the user's ear.

12. The apparatus of claim 10, comprising:
a transducer configured to:
apply the acoustic stimulus; and
detect the response signal of the user's ear.

13. An electronic device, comprising the apparatus of claim 10.

14. A non-transitory machine-readable medium storing instructions which, when executed by one or more processors, cause an electronic apparatus to:
applying an acoustic stimulus to a user's ear for a first function and for a second function, wherein the first function is to notify the user that biometric authentication or biometric enrolment or on-ear detection is taking place and the second function is to perform the biometric process;
receiving a response signal of a user's ear to the acoustic stimulus;
extracting, from the response signal, one or more features for use in a biometric process;
determining that the response signal is unsuitable for use in the biometric process; and
responsive to determining that the response signal is unsuitable for use in the biometric process, modifying the acoustic stimulus to improve the signal-to-noise ratio of the received response signal.

* * * * *